United States Patent
Yoshida et al.

(10) Patent No.: US 7,495,747 B2
(45) Date of Patent: Feb. 24, 2009

(54) RADAR APPARATUS

(75) Inventors: Takahiko Yoshida, Okazaki (JP); Akihiko Teshigahara, Nisshin (JP)

(73) Assignee: Denso Corporation, Kariya (JP)

( * ) Notice: Subject to any disclaimer, the term of this patent is extended or adjusted under 35 U.S.C. 154(b) by 125 days.

(21) Appl. No.: 11/325,553

(22) Filed: Jan. 5, 2006

(65) Prior Publication Data

US 2006/0152705 A1    Jul. 13, 2006

(30) Foreign Application Priority Data

Jan. 11, 2005    (JP)    ............... 2005-004444

(51) Int. Cl.
*G01C 3/08* (2006.01)
(52) U.S. Cl. ................................... 356/5.01
(58) Field of Classification Search ................. 356/5.01
See application file for complete search history.

(56) References Cited

U.S. PATENT DOCUMENTS

| | | | |
|---|---|---|---|
| 5,097,563 A * | 3/1992 | Cowan | 15/313 |
| 5,160,971 A | 11/1992 | Koshizawa | |
| 5,784,023 A * | 7/1998 | Bluege | 342/104 |
| 5,939,194 A | 8/1999 | Hashimoto et al. | |
| 6,013,372 A | 1/2000 | Hayakawa et al. | |
| 6,090,489 A | 7/2000 | Hayakawa et al. | |
| 6,524,664 B1 | 2/2003 | Hashimoto et al. | |
| 6,830,785 B1 | 12/2004 | Hayakawa et al. | |
| 2002/0016250 A1 | 2/2002 | Hayakawa et al. | |
| 2003/0123705 A1* | 7/2003 | Stam et al. | 382/104 |
| 2004/0145457 A1* | 7/2004 | Schofield et al. | 340/425.5 |
| 2005/0019700 A1 | 1/2005 | Hayakawa et al. | |

FOREIGN PATENT DOCUMENTS

| | | | |
|---|---|---|---|
| DE | 10346872 | * | 6/2005 |
| EP | 527985 | * | 2/1993 |
| JP | U-60-76279 | | 5/1985 |
| JP | U-60-76280 | | 5/1985 |
| JP | 02-098620 | * | 4/1990 |
| JP | A-2-98620 | | 4/1990 |
| JP | U-4-57469 | | 5/1992 |
| JP | U-454745 | | 5/1992 |
| JP | U-4-110996 | | 9/1992 |
| JP | U-5-28759 | | 4/1993 |
| JP | A-5-157830 | | 6/1993 |
| JP | U-5-87580 | | 11/1993 |
| JP | A-9-211108 | | 8/1997 |
| JP | A-11-142514 | | 5/1999 |

* cited by examiner

*Primary Examiner*—Thomas H. Tarcza
*Assistant Examiner*—Luke D Ratcliffe
(74) *Attorney, Agent, or Firm*—Posz Law Group, PLC

(57) ABSTRACT

In a radar apparatus, a radar device emits a transmission wave to a periphery of a vehicle and detects a reflected wave of the transmission wave through a window part. As a member for restricting or reducing adhesion of dirt and foreign materials to the window part, an air duct is provided to apply air toward the window part. An air outlet portion of the air duct is open at a periphery of the window part and has a passage area smaller than that of an air inlet portion, which opens to a vehicle forward direction. While the vehicle is running, air is blown from the air outlet portion to flow along the window part at high speed after its pressure is increased in the air duct. Thus, dirt and materials adhering or adhered to the window part is effectively blown off.

4 Claims, 4 Drawing Sheets

RADAR APPARATUS

CROSS REFERENCE TO RELATED APPLICATION

This application is based on Japanese Patent Application No. 2005-4444 filed on Jan. 11, 2005, the disclosure of which is incorporated herein by reference.

FIELD OF THE INVENTION

The present invention relates to a radar apparatus that emits a transmission wave to a periphery of a vehicle and detects a reflected wave reflected by an object through a window.

BACKGROUND OF THE INVENTION

A radar apparatus, which emits a transmission wave to a periphery and detects a reflected wave through a transparent window, is for example employed to a laser radar apparatus for a vehicle to detect a distance between the vehicle and an object existing around the vehicle. In such a laser radar apparatus, if dirt such as mud, oil, raindrops, snow or insects adheres to the window, detection accuracy is likely to deteriorate.

For example, Japanese Unexamined Patent Publication No. 9-211108 discloses a scanning-type laser radar apparatus capable of detecting the degree of dirt adhered to the transparent window. Specifically, a laser light is reflected and scattered by a scattering plate provided at one of left and right ends of the apparatus. A laser light, which is reflected and scattered into the inside from a transparent window by dirt adhered to an outside of the transparent window, is received by a photodetector. When the amount of the received light is more than a predetermined threshold, it is determined that the amount of dirt adhered to the transparent window is more than an allowable amount. Although the apparatus can detect the dirt, it is necessary to remove the dirt every time the dirt is detected.

SUMMARY OF THE INVENTION

The present invention is made in view of the foregoing matter, and it is an object of the present invention to provide a radar apparatus capable of decreasing or restricting adhesion of dirt and foreign materials to a window part.

According to a first aspect of the present invention, a radar apparatus has a radar device that emits a transmission wave and detects a reflected wave of the transmission wave, and a window part provided at a front of the radar device for allowing the transmission wave and the reflected wave to pass through. Further, the radar apparatus has an air passage member as an adhesion restricting member for restricting or reducing adhesion of dirt and foreign materials, such as raindrops, snow, dust, or insects, to the window part. The air passage member has an air inlet portion and an air outlet portion and defines an air passage therein. The air passage member is arranged at a position without interfering with the transmission wave and the reflected wave. Further, the air inlet portion is located to open in a vehicle forward direction. The air outlet portion is located at a periphery of the window part for applying air toward an outer surface of the window part. The air outlet portion has a passage area smaller than that of the air inlet portion.

Accordingly, a flow speed of air is increased in the air passage member, and the air is blown from the air outlet portion at high speed toward the window part. Therefore, adhesion of dirt and foreign materials to the window part is restricted or reduced with such a simple structure.

According to a second aspect of the present invention, the radar apparatus has a coating layer made of a water repellent material on the outer surface of the window part, as the adhesion restricting member. Thus, dirt or liquid adhered to the window part is easily removed from the window part.

According to a third aspect of the present invention, the radar apparatus has a vibrator for applying ultrasonic vibration to the window part, as the adhesion restricting member. Thus, adhesion of dirt and foreign materials is restricted or reduced.

According to a fourth aspect of the present invention, the radar apparatus has a heating member on a surface of the window part, as the adhesion restricting member. Even if liquid such as raindrops or snow adheres to the window part, the window part is readily dried.

According to a fifth aspect of the present invention, the window part has an aerodynamic shape. Thus, adhesion of dirt or liquid such as raindrops to the window part is reduced or restricted by air flowing along the outer surface of the window part.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EMBODIMENTS

Figure 1:
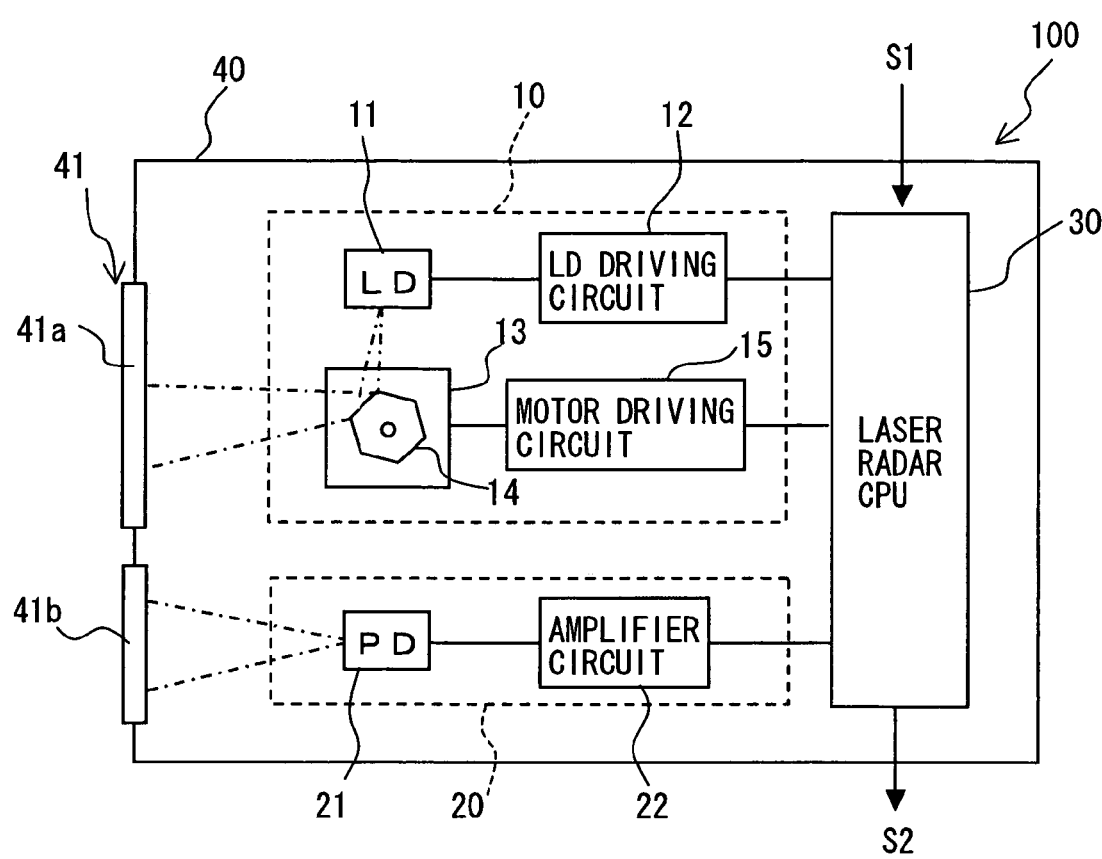
FIG. 1 is a schematic block diagram of a radar apparatus according to a first embodiment of the present invention.

Embodiments of the present invention will be described hereinafter with reference to the drawing.

First Embodiment

Referring to FIG. 1, a radar apparatus 100 of a first embodiment is provided to detect a distance from an object existing in a scanning area. For example, the radar apparatus 100 is used to a vehicle control unit that warns the existence of obstacles in a warning area or controls a speed of the vehicle according to a speed of a forward vehicle.

The radar apparatus 100 of the embodiment is characterized to have an adhesion restricting member for decreasing or restricting adhesion of dirt and foreign materials such as mud, raindrops, snow, or insects to an outer surface of a window part. Other structural parts can be similar to general radar devices and are not described in detail. In FIG. 1, the adhesion restricting member, which is a characterizing part of the embodiment, is not illustrated for the convenience of illustration. Structure of the adhesion restricting member will be described later in detail.

First, the radar apparatus 100 is constructed of a light radiating part 10, a light receiving part 20, and a laser radar CPU 30, as main parts, as shown in FIG. 1. The preceding parts 10, 20, 30 are housed in a housing 40.

The light radiating part 10 has a laser diode (hereafter, referred to as a LD) 11 that radiates a pulsed laser beam (e.g., having a wave length of infrared wave) through a scanner 13, as an element radiating a transmission wave. The LD 11 is connected to the laser radar CPU 30 through a laser diode driving circuit (hereafter, referred to as a LD driving circuit) 12. The LD 11 radiates a laser beam in accordance with a driving signal from the laser radar CPU 30, as shown by dashed lines in FIG. 1.

In the scanner 13, a polygon mirror 14 is rotatably arranged. When a driving signal from the laser radar CPU 30 is input to the scanner 13 through a motor driving circuit 15, the polygon mirror 14 is rotated by a motor (not shown). Thus, the laser beam from the LD 11 is radiated to scan an area in a predetermined angle. In this embodiment, for example, a scanning angle from a centerline of the vehicle as a center to a left side and a right side of the vehicle is approximately 7.8°, respectively. That is, an area in front of the vehicle is scanned within an angle approximately 15.6° with respect to the centerline of the vehicle as the center. Further, 105 laser beams are radiated every 0.15 second from the left to the right of the vehicle to scan the above area, for example.

The light receiving part 20 has a photo diode (hereafter, referred to as a PD) 21 that receives a reflected light (reflected wave), which is reflected by an object (e.g., a forward vehicle) existing in the scanning area, and outputs electric power (voltage) corresponding to the strength of the received light. Further, the electric power output from the PD 21 is sent to the laser radar CPU 30 as in a light receiving signal through an amplifier circuit 22.

The laser radar CPU 30 controls the LD driving circuit 12 and the motor driving circuit 15 to radiate the laser beam from the LD 11. Further, the CPU 30 calculates a distance between the vehicle and the object and a relative speed based on the signal output from the PD 21. Also, the CPU 30 receives a signal S1 of a vehicle speed from a speed sensor (not shown). The CPU 30 determines a risk of collision with the object based on the calculated results and the vehicle speed, thereby to output a warning signal S2 to an outer device such as a monitor and a beeper. The laser radar CPU 30, the light radiating part 10, and the light receiving part 20 provides a radar device (radar means).

The housing 40 has a window part 41 that allows the laser beam and the reflected laser beam to pass through. Further, the window part 41 is constructed of a cover glass (first window) 41a located to correspond to the scanner 13 to transmit the laser beam to the outside and a light receiving lens (second window) 41b located to correspond to the PD 21 to transmit the reflected laser beam to the PD 21. The structure of the window part 41 is not limited to the above. For example, both of the first window 41a and the second window 41b can be constructed of the cover glasses. Alternatively, both of the first window 41a and the second window 41b can be constructed of the light receiving lenses.

In the radar apparatus 100, if dirt or foreign materials, such as raindrops and mud due to splash, insects during night driving, snow, or dusts, adheres to the window part 41, the strength of light received by the PD 21 is likely to deteriorate, or the irradiation area of the laser beam is likely to be narrowed. Namely, the accuracy for detecting the distance between the vehicle and the reflecting object (e.g., forward vehicle) is likely to deteriorate, or it is difficult to detect the reflecting object.

Figure 2A:
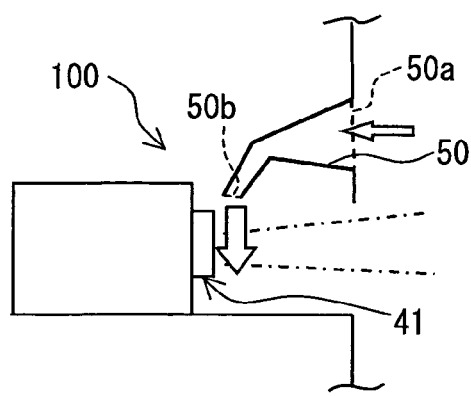
FIG. 2A is a side view of the radar apparatus according to the first embodiment of the present invention.
Figure 2B:
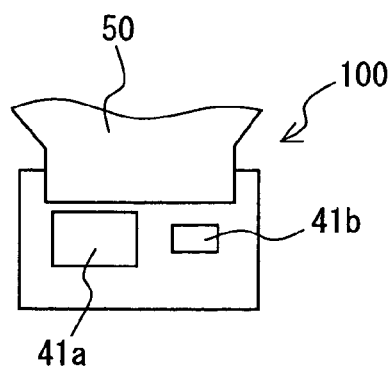
FIG. 2B is a front view of the radar apparatus according to the first embodiment of the present invention.

In view of the above matters, the radar apparatus 100 has the adhesion restricting member for decreasing or restricting adhesion of dirt and foreign materials to an outer surface of the window part 41. Specifically, as shown in FIGS. 2A and 2B, an air duct (air passage member) 50 is provided as the adhesion restricting member.

Figure 2C:
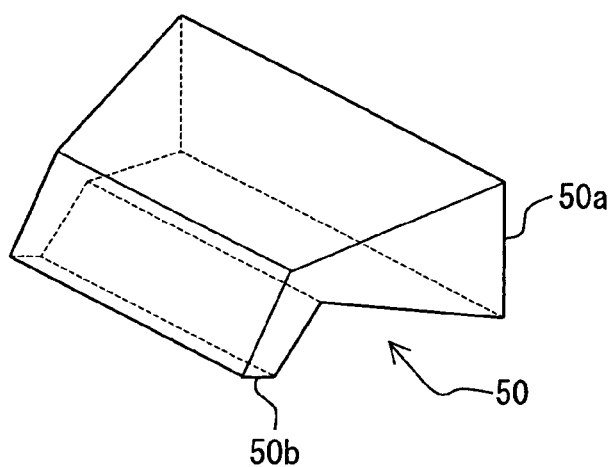
FIG. 2C is a perspective view of an air duct according to the first embodiment of the present invention.

The air duct 50 has a suction port (air inlet portion) 50a that is open to a vehicle forward direction and a discharge port (air outlet portion) 50b that is open at a periphery of the outer surface of the window part 41, and defines an air passage therein. Further, a passage area of the discharge port 50b is smaller than a passage area of the suction port 50a, as shown in FIG. 2C. The air duct 50 has a horn shape and is arranged at a position without interfering with the laser beam and the reflected light.

The discharge port 50b has substantially a rectangular shape with a predetermined width so that air is effectively applied over the first window 41a and the second window 41b. For example, a width the discharge port 50b is generally equal to or slightly wider than an overall width of the first window 41a and the second window 41b, as shown in FIG. 2B. The discharge port 50b is located at a position higher than the first window 41a and the second window 41b so that air is blown downwardly along the outer surfaces of the first window 41a and the second window 41b, i.e., an air curtain is formed along the first window 41a and the second window 41b.

Accordingly, when the vehicle runs, air is introduced in the air duct 50 from the suction port 50a and discharged from the discharge port 50b after a pressure of the sucked air is increased, i.e., a flow speed of the air is increased.

Thus, the air is blown downwardly along the outer surfaces of the first window 50a and the second window 50b at high speed, thereby to effectively blow off dirt and liquid such as raindrops adhered or adhering to the window parts 41.

According to the radar apparatus 100 of the embodiment, adhesion of dirt and foreign materials to the window part 41 is reduced or restricted with a simple structure. Here, a shape of the discharge port 50b is not limited to the rectangular shape, as long as the sectional area of the discharge port 50b is smaller than that of the suction port 50a.

Figure 3A:
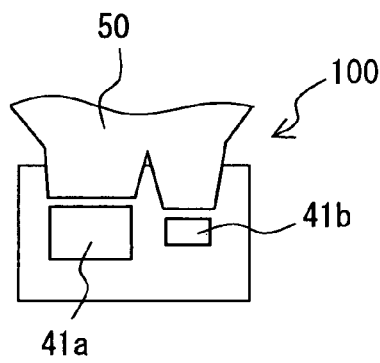
FIG. 3A is a front view of the radar apparatus showing a modification of the first embodiment of the present invention.
Figure 3B:
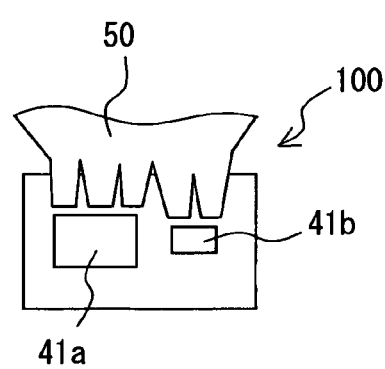
FIG. 3B is a front view of the radar apparatus showing another modification of the first embodiment of the present invention.

The first embodiment can be modified as shown in FIGS. 3A and 3B. For example, the air duct 50 can have two discharge ports each corresponding to the first window 41a and the second window 41b, as shown in FIG. 3A. Furthermore, as shown in FIG. 3B, each of the two separated discharge ports can be further divided into plural discharge ports. Also in the above cases, a total passage area of the plural discharge ports is smaller than the passage area of the suction port 50a.

The position of the air discharge port 50b is not limited to the top side of the window part 41 as long as the air is applied to flow along the outer surface of the window part 41. For example, the discharge port 50b is provided to open toward the window part 41. Alternatively, the discharge port 50b can be arranged to open between the first window 41a and the second window 41b toward the front face of the housing 40 so that the air is applied to flow along the outer surfaces of the first window 41a and the second window 41b towards the sides opposite to the air discharge port 50b.

Second Embodiment

Figure 4A:
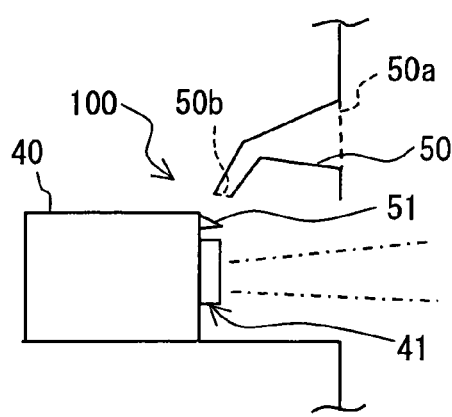
FIG. 4A is a side view of a radar apparatus according to a second embodiment of the present invention.
Figure 4B:
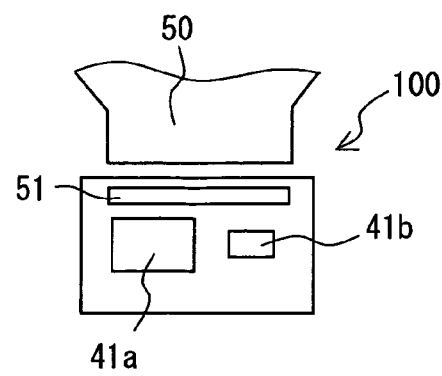
FIG. 4B is a front view of the radar apparatus according to the second embodiment of the present invention.

Referring to FIGS. 4A and 4B, the radar apparatus 100 of the second embodiment has an air spoiler 51 in addition to the air duct 50 as the adhesion restricting member. The structure of the air duct 50 is similar to the first embodiment. Also, the structure of the radar apparatus 100 other than the adhesion restricting member is similar to that of the first embodiment.

As shown in FIGS. 4A and 4B, the air spoiler 51 is located at a periphery of the window part 41 without interfering with the laser beam and the reflected light. For example, the air spoiler 51 is located above the window part 41 and below the discharge port 51b. The air spoiler 51 protrudes from a front face of the housing 40 in the forward direction.

Further, an upper surface of the air spoiler 51, which faces the discharge port 50b is sloped downward from the front face of the housing 40 to its protruding end, so that the air discharged from the air discharge port 50b is effectively led along the upper surface of the air spoiler 51 and further along the outer surface of the window part 41. Accordingly, the discharged air is effectively guided to flow along the outer surface of the window part 41 by the air spoiler 51. Thus, adhesion of dirt and foreign materials to the window part 41 is reduced or restricted.

Third Embodiment

Figure 5:
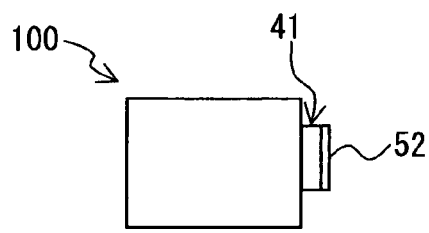
FIG. 5 is a side view of a radar apparatus according to a third embodiment of the present invention.

Referring to FIG. 5, the radar apparatus 100 of the third embodiment has a coating layer 52 on the outer surface of the window part 41 as the adhesion restricting member. The structure of the radar apparatus 100 other than the adhesion restricting member is similar to that of the first embodiment.

The coating layer 52 is made of a photocatalyst material (e.g., titanium oxide system), so that dirt and foreign materials adhered to the coating layer 52 is decomposed by a photocatalystic effect. That is, dirt and foreign materials adhered to the outer surface of the window part 41 is readily removed. Further, because the photocatalyst material has superhydrophilicity, even if raindrops adheres to the surface, it is less likely that the detection accuracy will be deteriorated, because of lens effect.

Further, the material of the coating layer 52 is not limited to the above photocatalystic material. For example, a water repellent material (e.g., fluorine system) can be used as the material of the coating layer 52. In this case, raindrops easily flows down.

Fourth Embodiment

Figure 6:
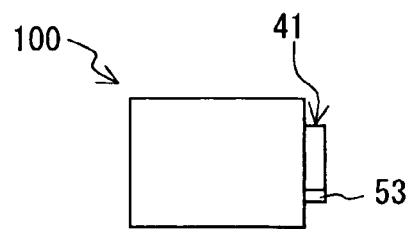
FIG. 6 is a side view of a radar apparatus according to a fourth embodiment of the present invention.

Referring to FIG. 6, the radar apparatus 100 of the fourth embodiment has a vibrator (vibrating member) 53 for applying ultrasonic vibration to the window part 41 as the adhesion restricting member. Structure of the radar apparatus 100 other than the adhesion restricting member is similar to that of the first embodiment. Specifically, an ultrasonic oscillator as the vibrator 53 is provided at an end of the window part 41 without interfering with the laser beam and the reflected light. The number of vibrator 53 is not limited. In the embodiment, the vibrator 53 is provided for each of the first window 51a and the second window 51b, for example.

The vibrator 53 is for example controlled to oscillate only when the vehicle is running by receiving the driving signal from the laser radar CPU 30. Accordingly, dirt and foreign materials, such as raindrops and dust, adhering or adhered to the outer surface of the window part 41 is sent away. In this way, the adhesion of dirt and foreign materials to the window part 41 is decreased or restricted. The control of the vibrator 53 is not limited to the above. Also, the fixing position of the vibrator 53 is not limited to the lower end of the window part 53.

Fifth Embodiment

Figure 7:
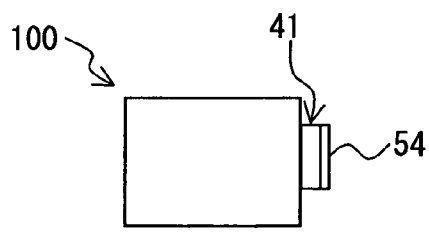
FIG. 7 is a side view of a radar apparatus according to a fifth embodiment of the present invention.

Referring to FIG. 7, the radar apparatus 100 of the fifth embodiment has a heating member 54 on a surface of the light transmitting window part 41 as the adhesion restricting member. Structure of the radar apparatus 100 other than the adhesion restricting member is similar to that the first embodiment.

As the heating member 54, a transference electrode such as an ITO film is provided on the surface of the window part 41. In this case, because the heating member 54 does not interfere with the laser beam and the reflected light, it is easy to design an electrode pattern.

The heating member 54 is for example controlled by the laser radar CPU 30 so that it is electrically conducted to generate heat only during the vehicle running. Accordingly, foreign materials, such as raindrops and snow, adhered to the outer surface of the window part 41 is dissolved and readily vaporated by heat. Also in the fifth embodiment, the adhesion of the foreign materials to the window part 41 is reduced or restricted.

The control of the heating member 54 is not limited to the above. Also, the heating member 54 is not limited to the transference electrode. For example, wires can be arranged without interfering with the laser beam and the reflected light.

Sixth Embodiment

Figure 8:
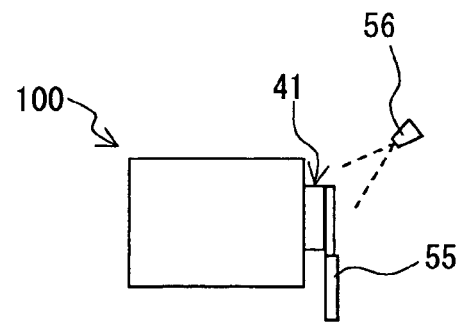
FIG. 8 is a side view of a radar apparatus according to a sixth embodiment of the present invention.

Referring to FIG. 8, the radar apparatus 100 of the sixth embodiment has a wiper member 55 as the adhesion restricting member. Structure of the radar apparatus 100 of the sixth embodiment other than the adhesion restricting member is similar to that of the first embodiment.

The wiper member 55 is provided to wipe over the outer surface of the light transmitting window part 41, without interfering with the laser beam and the reflected light. The foreign materials or dirt adhered to the window part 41 is removed by the wiper member 55. Accordingly, the adhesion of the foreign materials and dirt to the window part 41 is reduced.

In addition to the wiper member 55, a washer liquid supplying member 56 can be provided for spraying washer liquid to the outer surface of the window part 41, as shown by dotted line in FIG. 8, without interfering with the laser light and the reflected light. As the window part 41 is wiped by the wiper member 55 while spraying the washer liquid by the washer liquid supplying member 56, the foreign materials and dirt are more easily removed.

Furthermore, the washer liquid supplying member 56 and the wiper member 55 are operated at the timing that the laser light is not radiated. For example, the laser radar CPU 30 transmits an operation signal at a predetermined period. The washer liquid supplying member 56 and the wiper member 55 are operated without interfering with the laser beam and the reflected light, in accordance with the signal.

Here, the number of the wiper member 55 and the washer liquid supplying member 56 are not limited. Also, the fixing position of the wiper member 56 and the washer liquid supplying member 56 are not limited to the position shown in FIG. 8.

Seventh Embodiment

Figure 9:
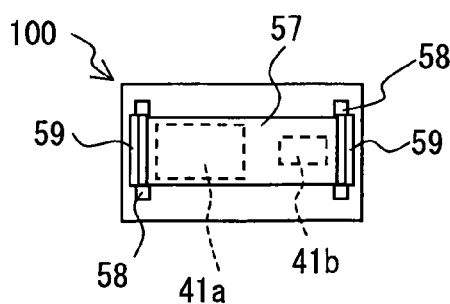
FIG. 9 is a front view of a radar apparatus according to a seventh embodiment of the present invention.

Referring to FIG. 9, the adhesion restricting member of the radar apparatus 100 is constructed of a screen 57, a driving member 58 and a removing member 59. Structure of the radar apparatus 100 of the seventh embodiment other than the adhesion restricting member is similar to that of the first embodiment.

Specifically, the screen 57 is arranged such that a part of the screen 57 fully covers the outer surface of the window part 41. The screen 57 allows the laser beam and the reflected light to pass through. The screen 57 is reciprocated or circulated by the driving member 58. The removing member 59 is arranged to contact a surface of the screen 57, thereby to remove the foreign materials or dirt.

The screen 57 is reciprocally supported by rollers that are provided a left end and a right end of the screen 57. The rollers are operated by the driving member 58, so that the screen 57 reciprocally moves in front of the window part 41, at a position adjacent to or in contact with the outer surface of the window part 41. Accordingly, it is less likely that foreign materials or dirt will directly adhere to the outer surface of the window part 41.

Further, the removing member 59 is for example a brush or scraper, and arranged at one of the ends or both ends of the screen member 57. The foreign materials or dirt adhered to the surface of the screen 57 is removed by the removing member 59 when the screen 57 is moved by the driving member 58 in accordance with a signal from the laser radar CPU 30, for example. Accordingly, a part of the screen 57 that covers the outer surface of the window part 41 is always maintained clean. The screen 57 can be moved continuously or moved with regular intervals.

The position of the roller is not limited to the left side and the right side of the window part 41. The rollers can be located at the top and the bottom of the window part 41 so that the screen 57 is scrolled vertically.

Eighth Embodiment

Figure 10:
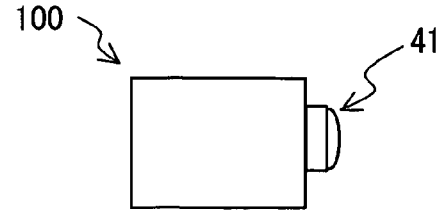
FIG. 10 is a side view of a radar apparatus according to an eighth embodiment of the present invention.

Referring to FIG. 10, the window part 41 of the radar apparatus 100 of the eighth embodiment has a shape reducing or restricting adhesion of dirt and foreign materials thereon.

Specifically, the light transmitting window part 41 has an aerodynamic shape so that air smoothly flows along the outer surface while the vehicle is running. For example, the outer surface of the window part 41 is inclined or curved, as shown in FIG. 10. Therefore, it is less likely that the dirt or foreign material adhere to the window part 41. Accordingly, the adhesion of dirt and foreign material is reduced or restricted.

Preferred embodiments of the present invention are described above. However, the present invention is not limited to the above embodiments, but may be implemented in other ways without departing from the spirit of the invention.

Further, the present invention can be implemented by combination of the above embodiments with any variation. For example, the air duct 50 can be used with the window part 41 having the coating layer 52. By combination of the above embodiments, adhesion of dirt and foreign materials is further effectively reduced or restricted.

In the above embodiments, the radar apparatus 100 uses the laser beam. The present invention is not limited to a radar apparatus radiating the laser beam. For example, the present invention can be applied to a radar apparatus that uses another transmission wave such as a millimeter wave or an ultrasonic wave. Further, the present invention can be employed to a forward information detecting apparatus having a CCD camera. Furthermore, the present invention is not limited to the vehicle distance detecting apparatus. The structure of the window part 41 is not limited to the above embodiments. For example, the first window 41a and the second window 41b can be constructed of a single cover glass.

What is claimed is:

1. A radar apparatus for a vehicle comprising:
a radar device emitting a transmission wave to a periphery of the vehicle and detecting a reflected wave of the transmission wave;
a window part located on a front surface of the radar device, the window part allowing the transmission wave and the reflected wave to pass through;
an air passage member defining an air passage therein and having an air portion opening to a vehicle forward direction for sucking air therein and an air outlet portion opening at a periphery of the window part for discharging the air to flow along an outer surface of the window part, and the air passage member being disposed at a position without interfering with the transmission wave and the reflected wave, wherein the air outlet portion has a passage area smaller than that of the air inlet portion; and
wherein the air outlet portion has a width equal to or greater than a width of the window part with respect to a horizontal direction.

2. A radar apparatus for a vehicle comprising:
a radar device emitting a transmission wave to a periphery of the vehicle and detecting a reflected wave of the transmission wave;
a window part located on a front surface of the radar device, the window part allowing the transmission wave and the reflected wave to pass through;
an air passage member defining an air passage therein and having an air inlet portion opening to a vehicle forward direction for sucking air therein and an air outlet portion opening at a periphery of the window part for discharging the air to flow along an outer surface of the window part, and the air passage member being disposed at a position without interfering with the transmission wave and the reflected wave, wherein the air outlet portion has a passage area smaller than that of the air inlet portion;
an air spoiler protruding from the front surface of the radar device between the window part and the air outlet portion, without interfering with the transmission wave and the reflected wave; and
wherein the air spoiler includes a wall that faces the air outlet portion of the air passage member, the wall of the air spoiler is sloped down forward such that the air discharged from the air outlet portion is aligned along the outer surface of the window part.

3. A radar apparatus for a vehicle comprising:
a radar device emitting a transmission wave to a periphery of the vehicle and detecting a reflected wave of the transmission wave;
a window part located on a front surface of the radar device, the window part allowing the transmission wave and the reflected wave to pass though;

an air passage member defining an air passage therein and having an air inlet portion opening to a vehicle forward direction for sucking air therein and an air outlet portion opening at a periphery of the window part for discharging the air to flow along an outer surface of the window part, and the air passage member being disposed at a position without interfering with the transmission wave and the reflected wave, wherein the air outlet portion has a passage area smaller than that of the air inlet portion;

wherein the window part is provided with a heating member;

the heating member includes a transference electrode disposed along the outer surface of the window part, and the transference electrode is electrically conducted to generate heat only when the vehicle is traveling.

4. A radar apparatus for a vehicle, comprising:

a housing having a window part at a front part thereof;

a light radiating part disposed in the housing for emitting a transmission wave to a periphery of the vehicle through the window part;

a light receiving part disposed in the housing for receiving a reflected wave of the transmission wave through the window part; and an air passage member defining an air passage therein and disposed in front of the housing at a position at which the air passage member does not interfere with the transmission wave and the reflected wave, the air passage member having an air inlet portion opening to a vehicle forward direction for drawing air in the air passage member and an air outlet portion opening at a periphery of the window part such that the air is directly blown toward the outer surface of the window part for reducing adhesion of materials on the outer surface of the window part, wherein the air outlet portion has a passage area smaller than that of the air inlet portion.

* * * * *